US011648800B2

(12) United States Patent
Winters (10) Patent No.: US 11,648,800 B2
(45) Date of Patent: May 16, 2023

(54) AIRCRAFT RECOVERY DOLLY

(71) Applicant: Mason Jess Winters, Price, UT (US)

(72) Inventor: Mason Jess Winters, Price, UT (US)

( * ) Notice: Subject to any disclaimer, the term of this patent is extended or adjusted under 35 U.S.C. 154(b) by 0 days.

(21) Appl. No.: 17/218,034

(22) Filed: Mar. 30, 2021

(65) Prior Publication Data

US 2021/0394556 A1 Dec. 23, 2021

Related U.S. Application Data

(60) Provisional application No. 63/002,282, filed on Mar. 30, 2020.

(51) Int. Cl.
| | |
|---|---|
| *B60B 30/10* | (2006.01) |
| *B60B 30/04* | (2006.01) |
| *B64F 5/50* | (2017.01) |

(52) U.S. Cl.
CPC .............. *B60B 30/10* (2013.01); *B60B 30/04* (2013.01); *B64F 5/50* (2017.01); *B60B 2900/111* (2013.01); *B60B 2900/212* (2013.01); *B60B 2900/3312* (2013.01); *B60B 2900/541* (2013.01); *B60B 2900/711* (2013.01)

(58) Field of Classification Search
CPC .......... B60B 30/10; B60B 30/04; B60B 30/02
USPC ........................................................ 414/429
See application file for complete search history.

(56) References Cited

U.S. PATENT DOCUMENTS

| | | | | |
|---|---|---|---|---|
| 4,401,405 A | * | 8/1983 | Ealet ...................... | B60B 30/02 414/428 |
| 5,049,025 A | * | 9/1991 | Roman ................... | B66F 5/025 414/429 |
| 5,259,572 A | * | 11/1993 | Franken .................... | B64F 1/22 244/50 |
| 5,336,037 A | * | 8/1994 | Curten ..................... | B64F 1/22 244/50 |
| 5,549,436 A | * | 8/1996 | Fresia ....................... | B64F 1/22 414/427 |
| 6,739,822 B2 | * | 5/2004 | Johansson ............... | B64F 1/227 244/50 |
| 7,597,524 B2 | * | 10/2009 | Hernandez ............ | B60B 29/002 414/427 |
| 8,911,194 B1 | * | 12/2014 | Spinazze ................ | B60B 30/10 414/427 |
| 8,967,939 B2 | * | 3/2015 | Hammonds ............. | B64F 1/227 244/50 |
| 9,108,463 B2 | * | 8/2015 | Winters .................. | B60B 30/10 |
| 9,440,491 B1 | * | 9/2016 | Belliveau ................ | B66F 7/246 |
| 9,573,420 B2 | * | 2/2017 | Hedley ..................... | B66F 7/22 |
| 10,226,964 B2 | * | 3/2019 | Rucchetto ............. | B60B 29/002 |

* cited by examiner

*Primary Examiner* — Jonathan Snelting
(74) *Attorney, Agent, or Firm* — Morriss O'Bryant Compagni Cannon, PLLC (57) ABSTRACT

A wheel dolly for lifting and transporting a flat tire attached to an aircraft is comprised of a frame assembly having first and second laterally spaced frame members and a telescopic frame structure interposed between the laterally spaced frame members. A pair of tire lifting assemblies are fixedly coupled the frame assembly. A pair of actuators is coupled between the tire lifting assemblies to force the tire lifting assemblies toward one another in order to raise a flat tire on an aircraft. A plurality of wheels is coupled to the frame assembly to allow the frame assembly to roll in any direction.

20 Claims, 7 Drawing Sheets

AIRCRAFT RECOVERY DOLLY

CROSS-REFERENCE TO RELATED APPLICATION

This application claims priority to Provisional Patent Application Ser. No. 63/002,282 filed on Mar. 30, 2020, the entirety of which is incorporated by this reference.

FIELD OF THE INVENTION

The present invention relates generally to a wheel dolly and, more specifically, to a wheel dolly particularly adapted for use with larger aircraft that allows a larger aircraft with one or more flat tires to be towed from a runway.

STATE OF THE RELATED ART

Various wheel dollies have been known primarily in the art for lifting and moving vehicular wheels. The wheel dollies may be used separately, in pairs or in any number corresponding to the number of wheels on a vehicle. Wheel dollies have been described in the art as consisting of two horizontal arms that are brought together toward the perimeter of a wheel. As the two arms are sufficiently brought together, the wheel is lifted from the ground and thus supported by the two arms and the wheel dolly.

Most prior art wheel dollies for vehicles are provided to move one or more wheels of a vehicle around a workshop. In such situations, the wheel is being moved a relatively short distance and on an even concrete surface such that the possibility of the wheel being dislodged from the wheel dolly is relatively low, even though the wheel is only supported by a pair of horizontally disposed arms. Moreover, such prior art wheel dollies are not particularly adapted for lifting a flat tire that is still attached to a vehicle in which case the weight of the vehicle makes it difficult if not impossible to get the horizontally disposed arms sufficiently under the tire to be able to raise it from the ground. Such prior art wheel dollies are thus not particularly adapted for use on a flat tire, especially a flat tire attached to an aircraft. Such prior art wheel dollies could result in pinching the tire, in being unstable during movement of the aircraft and/or in damaging to the aircraft. Moreover, such prior art wheel dollies are not particularly adapted to be driven over a distance under power of the vehicle.

A particular problem that exists at airports is that it is rather common for aircraft landing at the airport to experience a flat tire upon landing. This is often due to a harder than usual landing that causes one or more of the tires of the aircraft to blow. Once an aircraft has experienced a flat tire on landing, under normal circumstances, it cannot be moved from the runway until the flat tire has been replaced and the aircraft can then taxi from the runway. Obviously, the problem with such a situation is that the runway where the aircraft is parked while the flat tire is being replaced cannot be used. At smaller airports, especially single runway airports, this presents a particularly problematic and potentially dangerous situation. That is, if a runway of a single runway airport is closed due to an aircraft with a flat tire and another aircraft requires an emergency landing, there may be no safe place for the aircraft to land.

One particular solution for a wheel dolly for small aircraft is described in U.S. Pat. No. 9,108,463 to Winters (the '463 patent). The '463 patent discloses a wheel dolly for lifting and transporting a flat tire attached to an aircraft comprised of a frame assembly having first and second laterally spaced frame members and a telescopic frame structure interposed between the laterally spaced frame members. A pair of tire scoops are pivotally coupled the frame assembly. An actuator is coupled between the tire scoops to pivot the tire scoops relative to the frame assembly in order to raise the tire scoops. A plurality of castors is coupled to the frame assembly to allow the frame assembly to roll in any direction. The wheel dolly of the '463 patent, however, is not configured for handling wheels of various jet aircraft.

Thus, there exists a need in the art for a low-profile wheel dolly that may be used in rapid deployment to raise the wheel of jet aircraft that have experienced a flat tire, that allows the aircraft to taxi by being towed from the runway. The present invention provides a wheel dolly that is capable of safely and effectively addressing this need and others that will become apparent from description of the invention. The present invention is thus a significant improvement over wheel dollies known in the art.

SUMMARY OF THE INVENTION

Accordingly, the present invention provides a wheel dolly particularly configured for temporarily supporting and lifting a tire of an aircraft during taxi. The wheel dolly is configured for insertion beneath a flat tire still attached to the aircraft and safely lifts the flat tire off the ground. Once the flat tire has been lifted and supported by the wheel dolly, the aircraft can then be quickly and safely taxied from the runway, as by towing with a tug, tractor or other ground support transport equipment.

The wheel dolly may be configured to lift a wheel of an aircraft that weighs thousands of pounds, including those that weigh more than 8400 pounds having various wheel diameters and widths. The wheel dolly of the present invention is configured so that a single person can safely and easily operate it.

In one embodiment, a wheel dolly for lifting and transporting a flat tire attached to an aircraft comprises an extendable and retractable frame assembly having a telescopic frame structure. A first side frame member is coupled proximate a first end of the telescopic frame structure and a second frame member is coupled to proximate a second end of the telescopic frame structure. The first and second frame members depend from a same side of the telescopic frame structure and are substantially parallel to one another. A first tire support structure comprises a first plurality of inwardly extending roller support structures. Each inwardly extending roller support structure is fixedly coupled to the first side frame member and defines a first leading edge that is positioned proximate a ground level. A second tire support structure comprises a second plurality of inwardly extending roller support structures. Each inwardly extending roller support structure is fixedly coupled to the second side frame member and defines a second leading edge that is positioned proximate a ground level. A first plurality of idle roller members is coupled to and positioned between each of the first plurality of inwardly extending roller support structures proximate the first leading edge. A second plurality of idle roller members is coupled to and positioned between each of the second plurality of inwardly extending roller support structures proximate the second leading edge. A first actuator is coupled to the telescopic frame structure for selectively lengthening and shortening the telescopic frame member so as to selectively move a first side of the first and second tire support structures toward and away from one another. A second actuator is coupled to and between the first and second side frame members so as to selectively move a second side of the first and second tire support structures toward and away from one another in unison with the movement of the first side of the first and second tire support structures by the first actuator. A plurality of wheels, each wheel downwardly depending from the frame assembly, allow the wheel dolly to roll upon the ground.

In another embodiment, a second actuator is releasable from and reconnectable to the frame at at least one end thereof to allow the second actuator to be pivoted away from the frame member.

In another embodiment, the wheel dolly is positionable around the flat tire of the aircraft when the second actuator is released from the frame and the second actuator is reconnectable to the frame after the wheel dolly is positioned around the flat tire of the aircraft.

In yet another embodiment, the telescopic frame structure comprises a first telescopic frame member and a second telescopic frame member at least partially inserted with in the first telescopic frame member, the second telescopic frame member being longitudinally movable relative to the first telescopic frame member in order to increase or decrease a distance between the first and second tire support structures.

In still another embodiment, the first actuator is positioned within the first telescopic frame structure.

In another embodiment, the wheel dolly includes a self-contained hydraulic system coupled to the first and second actuators, the self-contained hydraulic system configured to control simultaneous lengthening or shortening of the first and second actuators.

In yet another embodiment, the first plurality of idle roller extends substantially an entire length of the leading edge.

In still another embodiment, the second plurality of idle roller members extends substantially an entire width of a respective one of the first and second tire lifting assemblies.

In yet another embodiment, a wheel dolly for lifting and transporting a flat tire attached to an aircraft comprises a frame assembly comprising first and second laterally spaced frame members and a telescopic frame structure interposed between the first and second laterally spaced frame members. A first actuator is positioned within the telescopic frame structure and capable of selectively increasing or decreasing a distance between the first and second laterally spaced frame members. A second actuator is coupled to the distal ends of the first and second laterally spaced frame members and is capable of selectively increasing or decreasing a distance between the first and second laterally spaced frame members at the same rate as the telescopic frame structure. Each of a pair of tire lifting assemblies is =fixedly coupled to a respective one of the first and second laterally spaced frame members. A plurality of castors is coupled to the frame assembly. Each of the plurality of castors is each freely rotatable relative to the frame assembly to allow the frame assembly to roll in any direction. The wheel dolly further includes a self-contained hydraulic system coupled to the first and second actuators to selectively extend or retract the first and second actuators to cause the first and second laterally spaced frame members to move toward or away from one another.

These and other aspects and advantages of the invention will become more apparent from the following detailed description thereof and the accompanying exemplary drawings.

BRIEF DESCRIPTION OF THE DRAWINGS

The following detailed description of the illustrated embodiments is better understood when read in conjunction with the appended drawings. For the purpose of illustrating the invention, there is shown in the drawings exemplary embodiments which illustrate what is currently considered to be the best mode for carrying out the invention, it being understood, however, that the invention is not limited to the specific methods and instruments disclosed. In the drawings.

DETAILED DESCRIPTION OF THE ILLUSTRATED EMBODIMENTS

Those of ordinary skill in the art will realize that the following description of the present invention is illustrative only and not in any way limiting. Other embodiments of the invention will readily suggest themselves to such skilled persons, including, without limitation, combinations of features of the illustrated embodiments. In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. Thus, the full scope of the invention is not limited to the examples that are described below.

Figure 1:
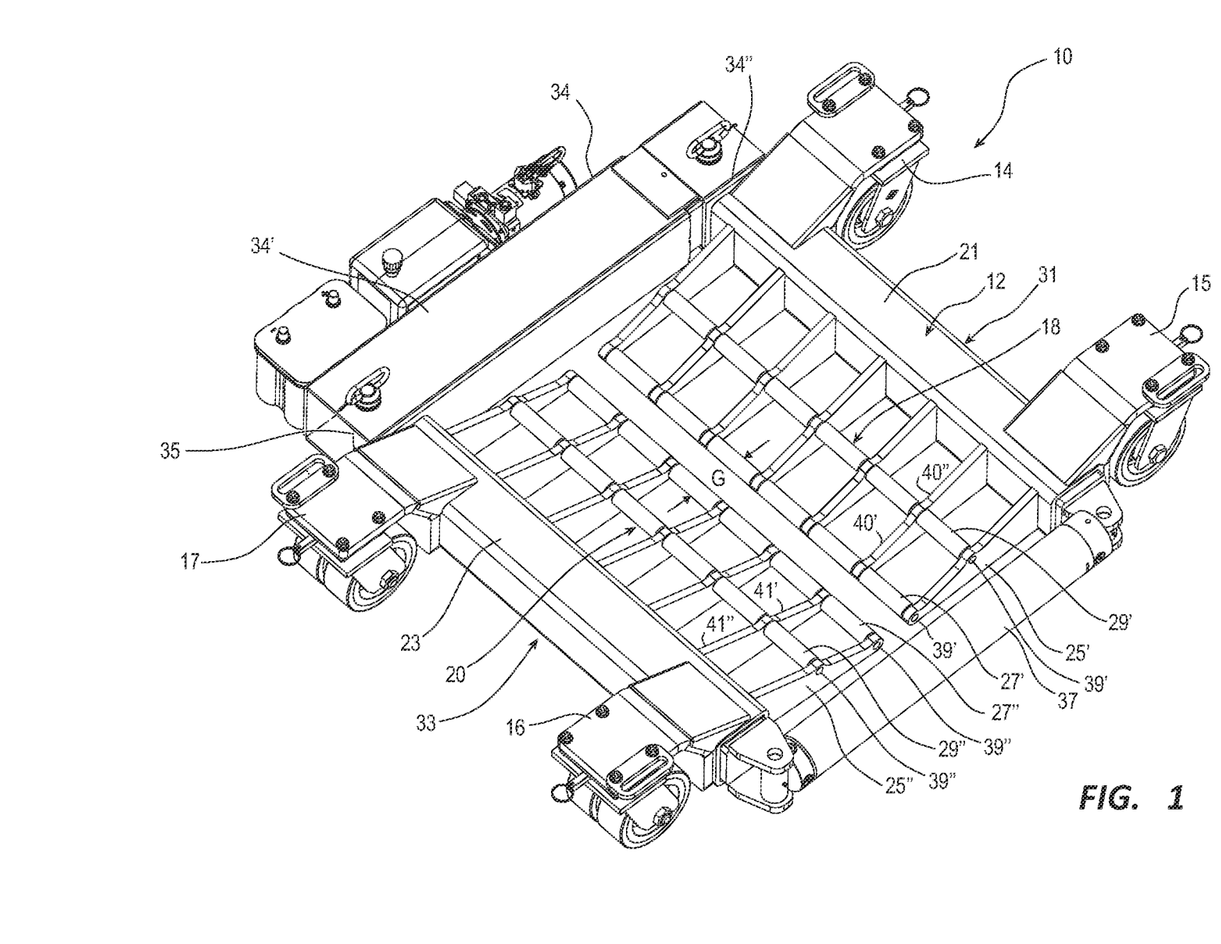
FIG. 1 is a perspective view of a wheel dolly in accordance with the principles of the present invention.

With reference now to the drawings in which like reference characters designate like or similar parts throughout the several views, FIG. 1 illustrates a wheel dolly, generally indicated at 10, in accordance with the principles of the present invention. The wheel dolly 10 is particularly configured for temporarily lifting and supporting one or more tires of an aircraft during taxi. The wheel dolly 10 is more importantly configured to lift and support one or more tires of an aircraft that have become flat upon landing to allow the aircraft to be taxied from a runway while the wheel dolly 10 is supporting the flat tire or tires of the aircraft.

The wheel dolly 10 is comprised of a three-sided, rectangular frame assembly 12 supported by a plurality of wheel assemblies 14-17, which may be in the form of casters, with each wheel assembly 14-17 positioned proximate one of the corners of the frame assembly 12. Each wheel assembly 14-17 is freely rotatable a full 360 degrees relative to the frame assembly 12. A pair of oppositely opposed tire support structures 18 and 20 are fixedly attached to the frame assembly 12, with tire support structure 18 fixed to frame member 21 and tire support structure 20 fixedly attached to frame member 23. The tire support structures 18 and 20 are each formed from a plurality of roller support members, such as roller support members 25' and 25". The roller support members 25' and 25" are evenly spaced along each respective frame member 21 and 23 and are separated by a plurality of roller members 27 and 29. The roller members 27', 27", 29' and 29" are each freely rotatably coupled to and supported by the roller support members 25' and 25", respectively. Each roller member 27', 27", 29' and 29" comprises a hollow cylinder through which respective support rods 39' and 39" pass through and are supported by the respective roller support members 25' and 25". The first roller members 27' and 27" are coupled to a distal end of the corresponding roller support members 25' and 25". The second roller members 29' and 29" are coupled proximate a midpoint of the corresponding roller support members 25' and 25" along a top edge thereof. The roller members 27', 27", 29' and 29" extend above the top surfaces 40', 40", 41' and 41" of the roller support members 25' and 25" respectively so that when a tire to be lifted by the wheel dolly 10 will engage the rollers members 27', 27", 29' and 29" and glide over the top surfaces 40', 40", 41' and 41" of the roller support members 25' and 25". Each roller support member 25 is generally in the form of a right with the base of the roller support member 25' and 25" have a generally triangular shape and are attached at their respective proximal ends to a respective one of the frame members 21 and 23 in a cantilevered manner with the widest end of each roller support member 25' and 25" attached to a facing side of the roller support members 25' and 25" so as to inwardly extend toward one another from the roller support members 25' and 25". The hypotenuse sides 40', 40", 41' and 41", respectively, of the roller support members 25' and 25" forms a downwardly angled surface extending from the respective frame member 21 and 23 so as to create an effective surface between all roller support members 25 that is higher proximate the respective frame member 21 and 23 and lower as it downwardly tapers toward the opposite frame member. The roller support members 25' and 25" essentially form a plurality of inwardly extending cantilevered fins or ribs that are spaced apart and laterally supported by the plurality of lower and upper roller members 27', 27", 29' and 29", respectively.

When brought together, the roller support members 25' and 25" combined with the plurality of upper and lower roller members 27', 27", 29' and 29" effectively form a V-shaped support surface for cradling and supporting above the ground one or more tires of an aircraft positioned thereon. Thus, each frame member 21 and 23, along with their respective roller support members 25' and 25" and roller members 27', 27", 29' and 29", form tire support assemblies 31 and 33. The tire support assemblies 31 and 33 are coupled to user actuated rams 35 and 37 that are configured to controllably move the tire support assemblies 31 and 33 away from and toward one another in order to capture and lift a flat tire on an aircraft off of the ground while still attached to the aircraft. That is, to capture a flat tire, the tire support assembles are moved by the rams 35 and 37 away from one another sufficiently so that a gap G between roller members 27 and 27" is wide enough to extend on opposite sides of the flat tire. The tire support assemblies 31 and 33 are then moved toward one another until the gap G is reduced so that the tire support assemblies 31 and 33 fully support the flat tire with the roller support members 25' and 25" and roller members 27', 27", 29' and 29" extending under the flat tire. The wheel assemblies 14-17 then allow the wheel dolly 10 to be maneuvered by the flat tire in any direction. When the aircraft has been taxied from the runway, the tire support assemblies 31 and 33 are moved apart a sufficient amount to allow the flat tire to rest on the ground and the wheel dolly 10 to be removed from the flat tire.

As previously mentioned, the frame assembly 12 is comprised of laterally spaced tire support assemblies 31 and 33. The spacing between tire support assemblies 31 and 33 is controlled and supported by a telescopic frame assembly 34. The telescopic frame structure 34 is configured to move the frame members 21 and 23 toward and away from each other so as to move the corresponding tire support assemblies 31 and 33 relative to one another. The telescopic frame assembly is comprised of two square or rectangular tubular members 34' and 34" that can slide relative to one another in a telescopic manner. As will be shown in more detail, the telescopic frame structure 34 includes a first hydraulic ram 35 positioned within the telescopic frame structure 34 to control extension and retraction of the telescopic frame structure 34. A second hydraulic ram 37 is removably coupled between distal ends of the frame members 21 and 23. The first and second hydraulic rams 35 and 37 control relative and simultaneous lateral movement of the first and second tire support assemblies 31 and 33 to and away from one another as needed. That is, the telescopic frame assembly 34 is actuated by its associated hydraulic ram 25 at the same time and the same extent as the hydraulic ram 37 on the opposite side of the wheel dolly 10 so as to be lengthened or shortened with corresponding lengthening or shortening of the second hydraulic ram 37 to control the spacing of the laterally tire support assemblies 31 and 33 in a linear manner. It should be noted that while the rams 35 and 37 have been described herein as being hydraulic rams, it is also contemplated that such rams may be in the form of threaded actuators, pneumatic actuators or other linear actuators or rams known in the art. In any case, corresponding movement of the telescopic frame structure 34 and the ram 37 causes the tire support assemblies 31 and 33 to move apart to allow one or more tires to be positioned between the tire support assemblies 31 and 33 and subsequently brought together to engage, support and lift the tire or tires with tire support assemblies 31 and 33 above the ground.

Figure 2:
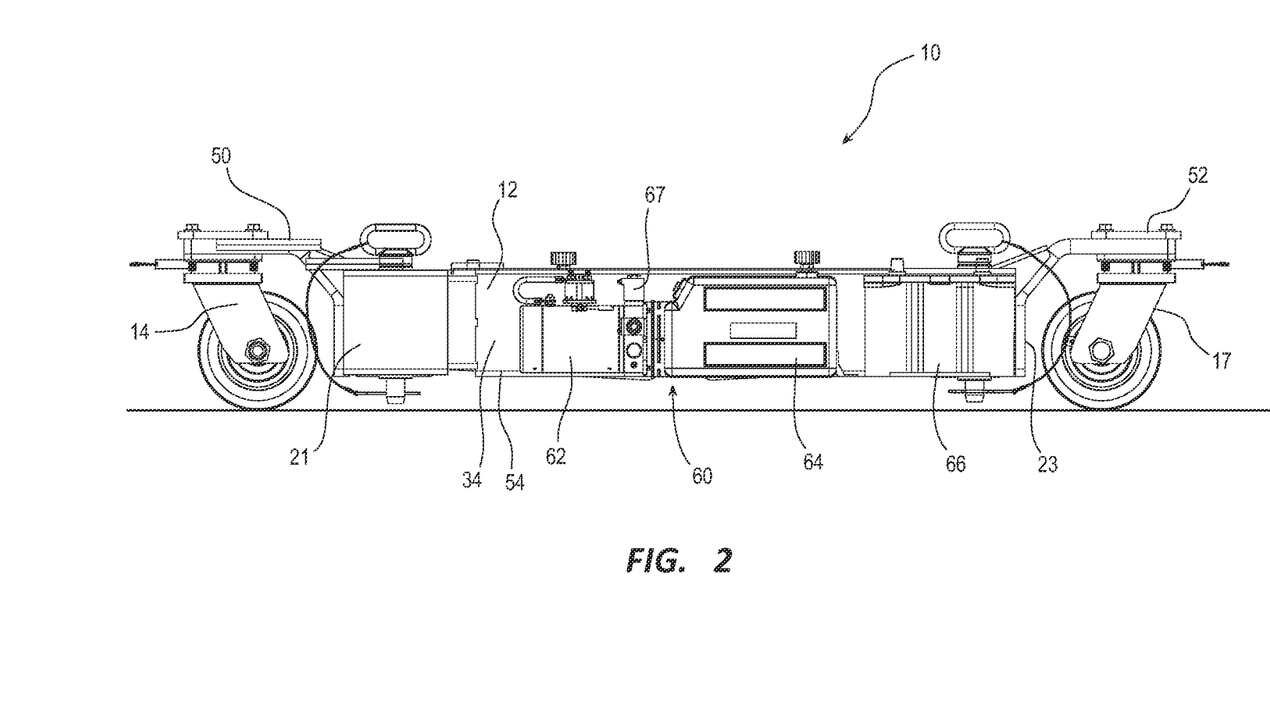
FIG. 2 is a first side view of the wheel dolly illustrated in FIG. 1.

As further shown in FIG. 2, the wheel dolly 10 includes four laterally extending wheel support brackets, two of which 50 and 52 are visible. The wheel support brackets 50 and 52 are fixedly attached to the respective frame members 21 and 23 and depend outwardly in a cantilevered manner, with one wheel support bracket at each of the four corners of the wheel dolly 10. The wheel assemblies 14 and 17 are respectively pivotally attached to the wheel brackets 50 and 52. The tops surfaces of the wheel brackets 50 and 52 are in a plane above and parallel to a plane defined by the top surfaces of the frame members 21 and 23. This allows for larger wheels 14-17 to be employed while keeping the positions of the tire support assemblies 31 and 33 (see FIG. 1) relatively low to the ground. This is important to ensure that the tire support assemblies 31 and 33 impinge upon a flat tire at a low enough position that the flat tire will be forced over the top surfaces of the tire support assemblies 31 and 33 when they are brought together by the rams 34 and 37. Thus, a distance from the top portion of the wheel brackets 50 and 52 is such that the wheel assemblies 14 and 17 position the bottom surface 54 of the frame assembly 12 above the ground. This ensures that the wheel dolly 10 can freely glide along the ground in any direction without the bottom surface 54 of the wheel dolly 10 contacting the ground.

As also shown in FIG. 2, the wheel dolly 10 includes a self-contained hydraulic system 60 that provides pressurized hydraulic fluid to the two hydraulic actuators 35 and 37 (see FIG. 1). The hydraulic system 60 is comprised of an electric hydraulic pump 62, a hydraulic fluid reservoir 64 and a battery 66. The hydraulic pump 62, hydraulic fluid reservoir 64 and battery 66 are mounted to the outside of the telescopic frame member 34. The battery 66 is electrically coupled to and supplies power to the hydraulic pump 62 which draws or returns hydraulic fluid to the reservoir 64 to selectively control the movement of the hydraulic actuators 35 and 37 to either extend the frame assembly 12 or retract the frame assembly 12 as desired. A controller 67 is electrically coupled to the hydraulic pump 62 to allow a user to control movement of the hydraulic actuators 35 and 37. The controller 67 may be a wired handheld remote in which a cable (not shown) is coupled to the controller 67 or may be a wireless handheld remote in which the controller 67 receives a signal from the remote to control movement of the hydraulic actuators 35 and 37.

Figure 3:
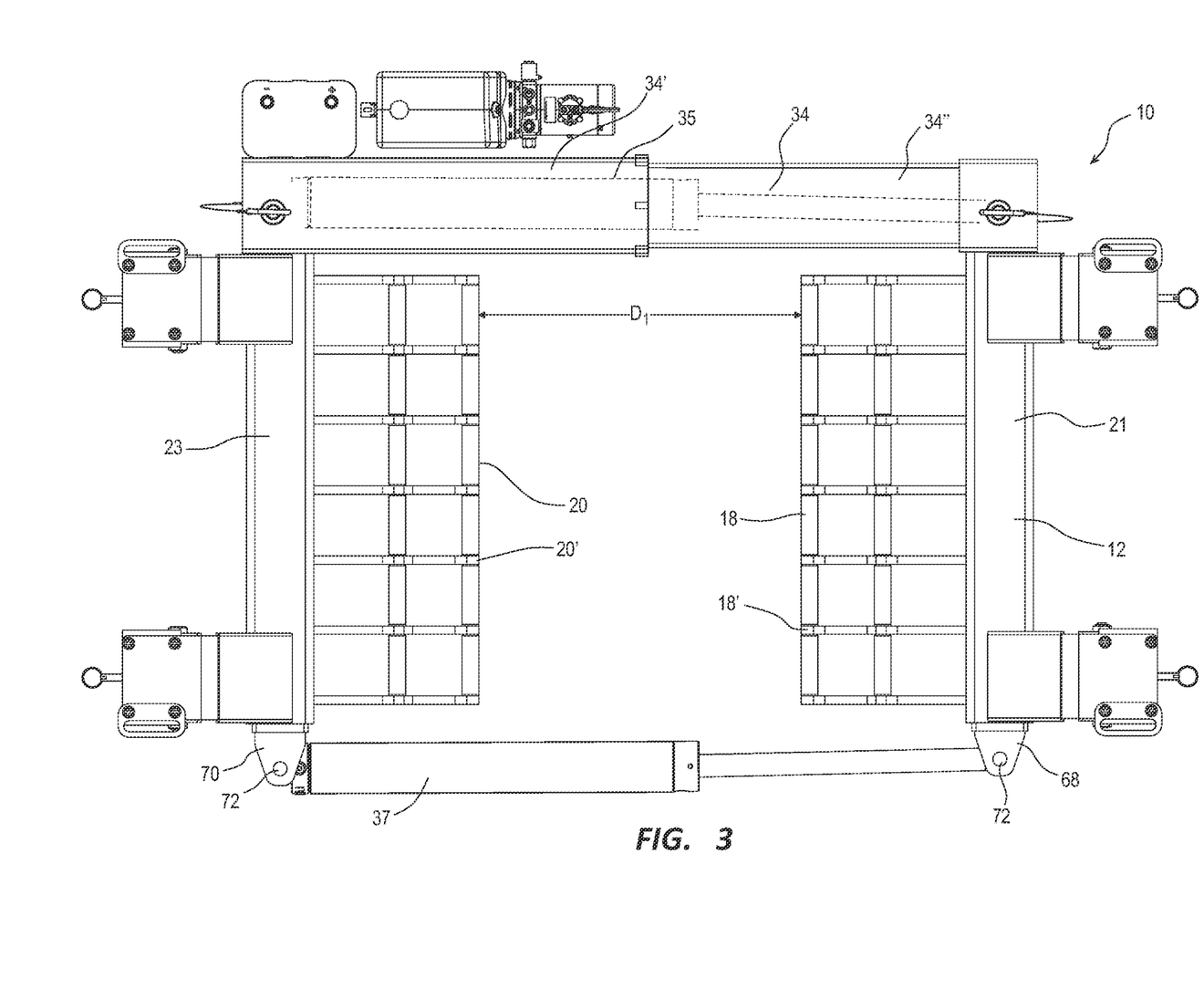
FIG. 3 is a top view of the wheel dolly illustrated in FIG. 1.
Figure 4:
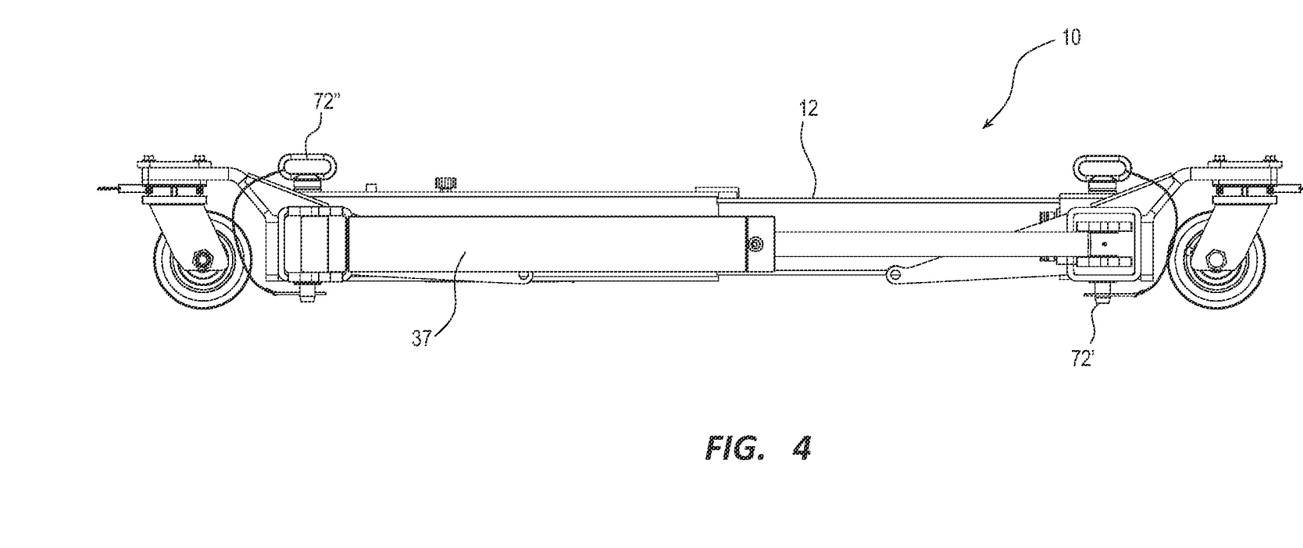
FIG. 4 is a second view of the wheel dolly illustrated in FIG. 1.

Referring now to FIGS. 3 and 4, the hydraulic actuator 37 is pinned to and between mounting brackets 68 and 70 with removable pins 72' and 72", respectively. As will be described in more detail below, removal of one of the pins 72' or 72" allows the hydraulic actuator 37 to pivot relative to the remaining pin and swing out from the frame assembly 12. As will be further described, this allows access to the tire lifting assemblies 18 and 20. In order to raise a flat tire of an aircraft, the frame assembly 12 of the wheel dolly 12 is expanded by actuating the hydraulic actuators 35 and 37 to an extended position as shown, thus causing the telescopic frame member 34 to lengthen and the frame members 21 and 23 and corresponding wheel tire lifting assemblies 18 and 20 to separate relative to one another. The distance D1 between the wheel tire lifting assemblies 18 and 20 is such that a flat tire of an aircraft can fit between the inner most surfaces of the tire lifting assemblies or scoops 18 and 20. The telescopic frame assembly 34 has sufficient lateral structural integrity to support the weight of the tire or tires of the aircraft being supported plus the corresponding weight of the aircraft when lifted. As the telescopic frame assembly 34 is contracted, and the weight of the aircraft on the telescopic frame assembly 34 increases, more of the telescopic frame member 34 overlaps with itself to increase its lateral load bearing capabilities.

Referring again to FIG. 3, the telescopic frame member 34 is comprised of a first rectangular frame member 34' and a second rectangular frame member 34" that is sized and shaped to fit and slide within the first rectangular frame member 34'. Retraction of the hydraulic actuator 35 causes the second frame member 34" to be retracted within the first frame member 34'. Because the frame member 21 is attached to the second frame member 34" and to one end of the actuator 37 and because the frame member 23 is attached to the first frame member 34' and the opposite end of the actuator 37, retraction of the second frame member 34" into the first frame member 34' with simultaneous retraction of the actuator 37 at the same rate moves the frame member 21 toward the frame member 23 while maintaining their substantially parallel relationship in order to bring the tire lifting assemblies 18 and 20 toward one another. In addition, because the ends 18' and 20' of the tire lifting assemblies 18 and 20 are the first portions of the tire lifting assemblies 18 and 20 to engage the tire with the ends 18' and 20' of the tire lifting assemblies 18 and 20 positioned just above the ground and below the lower half of the tire to be lifted, the tire lifting assemblies 18 and 20 can move under the tire until the tire is adequately lifted off the ground.

Figure 5:
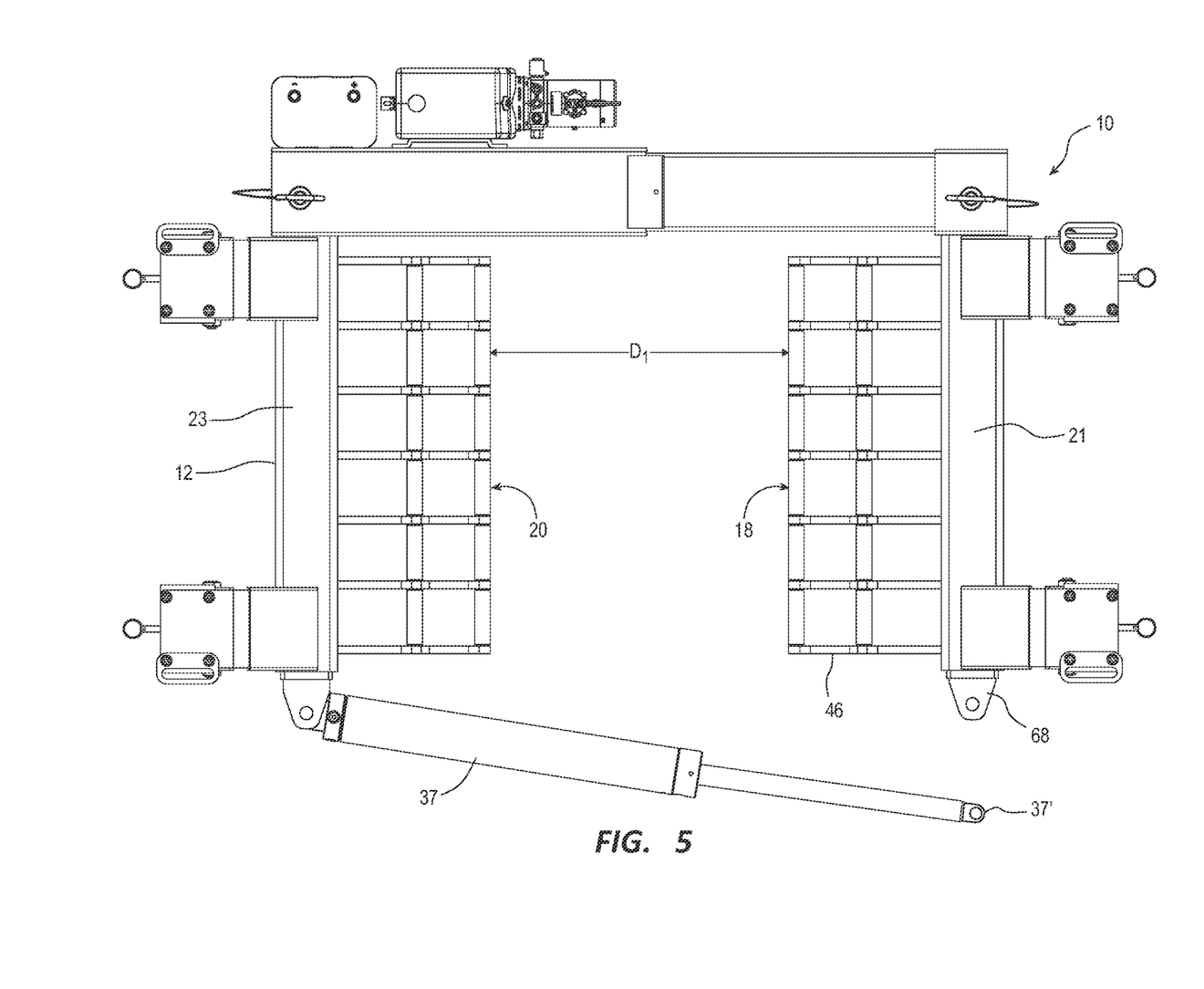
FIG. 5 is s top view of the wheel dolly illustrated in FIG. 1 with the second actuator in a disengaged position.

As shown in FIG. 5, once the frame members 21 and 23 and corresponding wheel tire lifting assemblies 18 and 20 are separated a sufficient distance D1 to allow the lifting assemblies 18 and 28 to be positioned on opposite sides of a flat tire, one end 37' of the actuator 37 is unpinned and released from the bracket 68, thus allowing the actuator 37 to pivot outwardly from the frame assembly 12 as shown. The actuator 37 is able to pivot at least 180 degrees from its pinned position (see FIG. 3) so that the wheel dolly 12 can be maneuvered around a flat tire of an aircraft.

Figure 6:
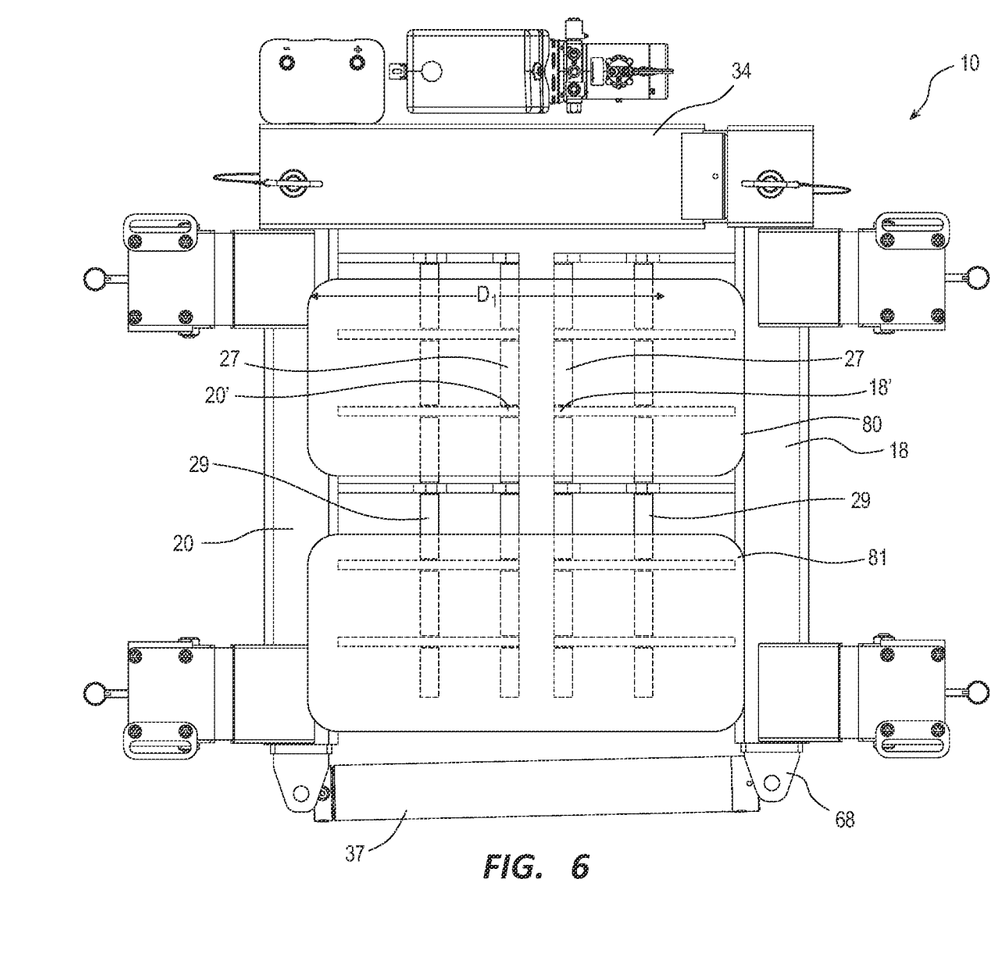
FIG. 6 is a top view of the wheel dolly illustrated in FIG. 1 supporting a pair of tires.
Figure 7:
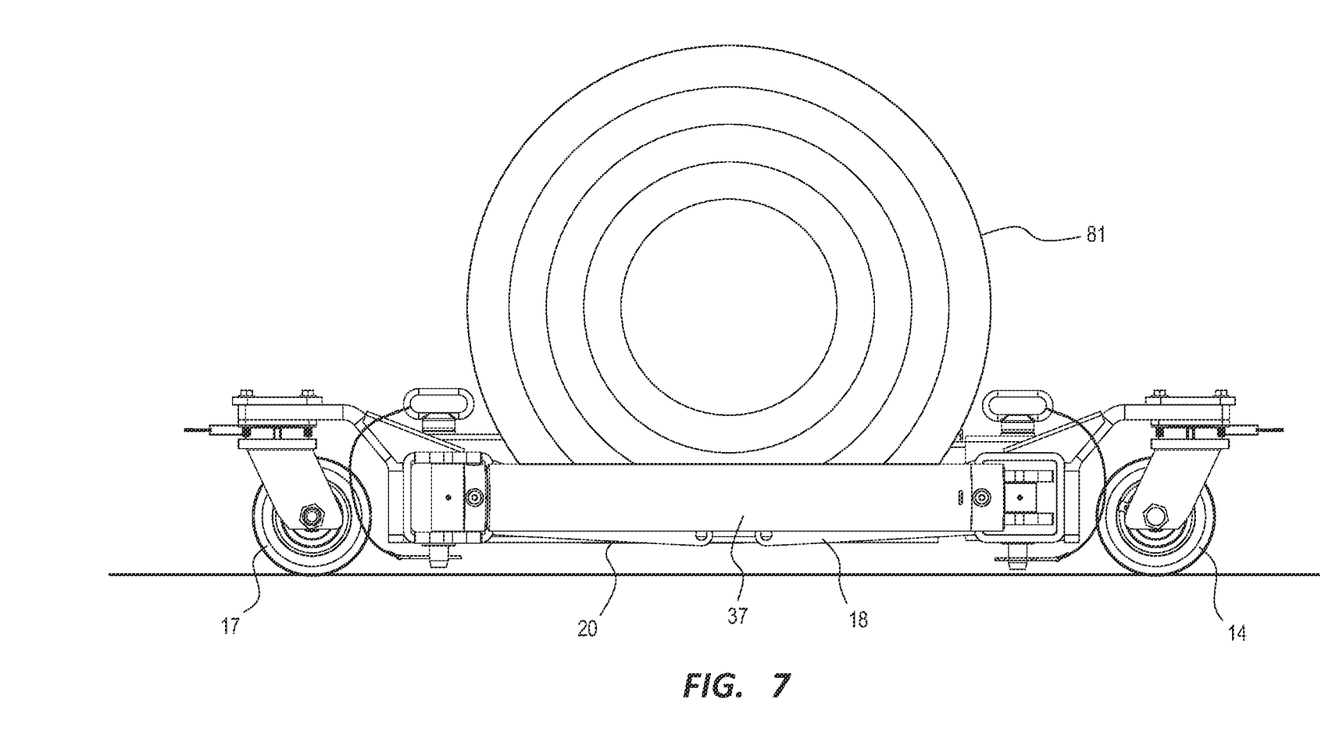
FIG. 7 is a side view of the wheel dolly illustrated in FIG. 6.

The tire lifting assemblies 18 and 20 are accessible through the open or distal side 46 of the frame 12. This allows the wheel dolly 10 to be rolled and maneuvered toward a tire resting on the ground with the tire entering the open side 46 of the frame 12 until the tire is positioned between the tire lifting assemblies 18 and 20. The tire lifting assemblies 18 and 20 are initially spaced apart a sufficient distance D1 to allow the wheel dolly 10 to be rolled into position with the tire lifting assemblies 18 and 20 positioned on opposite sides of the tire or tires to be lifted. Once positioned with the tire or tires positioned between the lifting assemblies 18 and 20 and thus positioned on opposite sides of the tire or tires, as shown in FIGS. 6 and 7, the free end of the actuator 37 is reconnected to the bracket 68 and the tire lifting assemblies 18 and 20 are brought together until the tire lifting assemblies 18 and 20 adequately support the tire. In order to facilitate positioning the tires 80 and 81 on top of the tire lifting assemblies 18 and 20, engaging ends 18' and 20' of the tire lifting assemblies 18 and 20 are provided with elongate idle roller assemblies 27. The idle roller assemblies 27 are rotatably attached to the engaging ends 18' and 20' of the tire lifting assemblies 18 and 20 and supported by the roller support members 25 that depend from a respectively from the frame members 21 and 23. In addition, a second set of idle roller assemblies 29 are coupled to the roller support members 25 proximate a midpoint thereof with the idle roller assemblies 29 further assisting in the movement of the roller support members 25 under the tires 80 and 81. Thus, the idle roller assemblies 27 and 29 allow the engaging ends 18' and 20' of the tire lifting assemblies 18 and 20 to slide under the flat tires 80 and 81 without damaging the tires, essentially providing a rolling engagement of the tire lifting assemblies 18 and 20 with the tire as the tire lifting assemblies 18 and 20 are brought closer together in order to lift the tires 80 and 81.

As shown in FIGS. 6 and 7, the tire lifting assemblies 18 and 20 are first brought together by shortening the length of the telescopic frame member 34 and the simultaneous shortening of the length of the hydraulic actuator 37. The telescopic frame member 24 and hydraulic actuator 37 are simultaneously shortened (or lengthened when releasing the tires) in order to maintain the frame members 18 and 20 in a parallel arrangement throughout the range of movement of the frame members 18 and 20.

As shown in FIG. 7, once the tire lifting assemblies 18 and 20 are sufficiently forced into engagement with the tire 80 so that the tire 80 is lifted off the ground, the tire lifting assemblies 18 and 20 rigidly hold the tire 80 in place relative to the tire lifting assemblies 18 and 20 such that the wheel dolly 10 fully supports the tire 80 and the wheel dolly allows the tire 80 (with aircraft attached) to be transported as the wheels 14 and 17 roll along the ground.

As illustrated in the figures, the wheel dolly 10 is configured to have a relatively low center of gravity so as to allow the wheel dolly 10 to have a relatively low profile and also to allow the wheel dolly 10 to be used over long distances of taxiing an aircraft without the possibility of the wheel dolly 10 being tipped or otherwise dislodged from the tire it is supporting. This, in combination with the effective width of the wheel dolly 10 beyond the width of the tires being supported ensures that the wheel dolly 10 can provide safe and effective transport of, for example, a dual wheel and tire still attached to an aircraft as the aircraft is taxied from a runway. As previously discussed, each wheel assembly 14-17 is coupled to the frame 12 proximate the effective corners thereof. The wheels 14-17 are self-orienting and freely rotatable relative to the frame such that the axis of rotation of each wheel of the castor is vertically and horizontally offset from the center or rotation at the location where the wheel is attached to the frame 12. Thus, depending on the direction of movement of the frame 12, the wheels will self-orient themselves, since they are freely rotatable a full 360 degrees, and will roll in a proper direction relative to the movement of the frame 12, much like a wheel on a shopping cart. The attachment brackets, such as attachment brackets 50 and 52 depend from and are upwardly angled away from the frame members 21 and 23 so as to allow for larger sized wheels 14-17 to be utilized while still maintaining a relatively low center of gravity of the wheel dolly 10 as well as positioning the tire lifting assemblies 18 and 20 at ground level. The wheels 14-17 may be bolted to the brackets 50 and 52 so as to allow replacement of a wheel if the wheel becomes damaged during use.

The frame assembly 12 and tire lifting assemblies 18 and 20 (see FIG. 1) are comprised of metal, such as aluminum, steel or other metals known in the art. The roller members 27 may also be formed from metal or from a durable rubber or plastic material known in the art. The roller members 27 effectively form the leading or tire engaging ends of the tire lifting assemblies 18 and 20. The roller members 27 and 29 help guide the leading or tire engaging end of the tire lifting assemblies 18 and 20 as well as the body of the tire lifting assemblies 18 and 20 as the tire moves up the tire lifting assemblies 18 and 20. The first set of roller members 27 are arranged in a row along the distal ends of the roller support members 25 and the second set of roller members 29 are also arranged in a row that is spaced and in parallel to the first set of roller members 25. The idle rollers 27 and 29 prevent any additional damage to the tire as the tire lifting assemblies 18 and 20 are forced under the tire by providing rolling contact between the tire and the tire lifting assemblies 18 and 20, with the understanding that the weight of the aircraft on a flat tire will tend to make it difficult to slide an object under the tire. Thus, the tire lifting assemblies 18 and 20 can be forced under a flat tire that is still attached to an aircraft without further damaging the tire in order to successfully lift and support the aircraft tire with the wheel dolly 10 of the present invention.

The wheel dolly may include a pull handle attached to the frame assembly 12. Likewise, a tether or tug member can be attached to the frame assembly to pull the wheel dolly 10 to a desired location.

While the wheel dolly of the present invention has been described with reference to certain illustrative embodiments to illustrate what is believed to be the best mode of the invention, it is contemplated that upon review of the present invention, those of skill in the art will appreciate that various modifications and combinations may be made to the present embodiments without departing from the spirit and scope of the invention as recited in the claims. The claims provided herein are intended to cover such modifications and combinations and all equivalents thereof. Reference herein to specific details of the illustrated embodiments is by way of example and not by way of limitation.

Thus, aspects and applications of the invention presented here are described in the drawings and in the foregoing detailed description of the invention. Those of ordinary skill in the art will realize that the description of the present invention is illustrative only and not in any way limiting. Other embodiments of the invention will readily suggest themselves to such skilled persons including, without limitation, combinations of elements of the various embodiments. Various representative implementations of the present invention may be applied to any tie down cargo restraining system.

Unless specifically noted, it is intended that the words and phrases in the specification and the claims be given their plain, ordinary, and accustomed meaning to those of ordinary skill in the applicable arts. It is noted that the inventor can be his own lexicographer. The inventor expressly elects, as his own lexicographer, to use the plain and ordinary meaning of terms in the specification and claims unless they clearly state otherwise in which case, the inventor will set forth the "special" definition of that term and explain how it differs from the plain and ordinary meaning. Absent such statements of the application of a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description of the Invention or claims is not intended to somehow indicate a desire to invoke the special provisions of 35 U.S.C. § 112(f) to define the invention. To the contrary, if the provisions of 35 U.S.C. § 112(f) are sought to be invoked to define the inventions, the claims will specifically and expressly state the exact phrases "means for" or "step for" and the specific function (e.g., "means for heating"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

What is claimed:

1. A wheel dolly for lifting and transporting a flat tire attached to an aircraft, comprising:

an extendable and retractable frame assembly having a telescopic frame structure, a first side frame member coupled proximate a first end of the telescopic frame structure, a second frame member coupled to proximate a second end of the telescopic frame structure, the first and second frame members depending from a same side of the telescopic frame structure and being substantially parallel to one another;

a first tire support structure comprising three or more first inwardly extending roller support structures, each of the inwardly extending roller support structures forming an inwardly extending cantilevered fin which forms a downwardly angled surface extending from the first frame member and lowers as it extends toward the second frame member, each first inwardly extending roller support structure fixedly coupled to the first side frame member in a cantilevered manner and defining a first leading edge that is positioned proximate a ground level;

a second tire support structure comprising three or more second inwardly extending roller support structures, each of the second plurality of inwardly extending roller support structures forming an inwardly extending cantilevered fin which forms a downwardly angled surface extending from the second frame member and lowers as it extends toward the first frame member, each second inwardly extending roller support structure fixedly coupled to the second side frame member in a cantilevered manner and defining a second leading edge that is positioned proximate a ground level;

a first plurality of idle roller members coupled to and positioned between each of the first inwardly extending roller support structures proximate the first leading edges thereof;

a second plurality of idle roller members coupled to and positioned between each of the second inwardly extending roller support structures proximate the second leading edges thereof;

a first actuator coupled to the telescopic frame structure for selectively lengthening and shortening the telescopic frame member so as to selectively move a first side of the first and second tire support structures toward and away from one another;

a second actuator coupled to and between the first and second side frame members so as to selectively move a second side of the first and second tire support structures toward and away from one another in unison with the movement of the first side of the first and second tire support structures by the first actuator; and a plurality of wheels, each wheel downwardly depending from the frame assembly to allow the wheel dolly to roll upon the ground.

2. The wheel dolly of claim 1, wherein the second actuator is releasable from and reconnectable to the frame assembly proximate to at least one end thereof to allow the second actuator to be pivoted away from one of the first or second frame member.

3. The wheel dolly of claim 2, wherein the wheel dolly is positionable around the flat tire of the aircraft when the second actuator is released from the frame assembly and the second actuator is reconnectable to the frame assembly after the wheel dolly is positioned around the flat tire of the aircraft.

4. The wheel dolly of claim 1, wherein at least one of three or more first inwardly extending roller support structures is interposed between two of the first plurality of idle roller members.

5. The wheel dolly of claim 4, wherein the first actuator is positioned within the first telescopic frame structure.

6. The wheel dolly of claim 4, wherein at least one of three or more second inwardly extending roller support structures is interposed between two of the second plurality of idle roller members.

7. The wheel dolly of claim 1, wherein the telescopic frame structure comprises a first telescopic frame member and a second telescopic frame member at least partially inserted within the first telescopic frame member, the second telescopic frame member being longitudinally movable relative to the first telescopic frame member in order to increase or decrease a distance between the first and second tire support structures.

8. The wheel dolly of claim 1, further comprising a self-contained hydraulic system coupled to the first and second actuators, the self-contained hydraulic system configured to control simultaneous lengthening or shortening of the first and second actuators.

9. The wheel dolly of claim 1, wherein the first plurality of idle roller members extends substantially an entire length of the first leading edge.

10. The wheel dolly of claim 1, wherein the second plurality of idle roller members extends substantially an entire width of a respective one of the first and second tire support structures.

11. The wheel dolly of claim 1, wherein the first plurality of idle roller members are coupled to distal ends of the three or more first inwardly extending roller support structures and the second plurality of idle roller members are coupled to distal ends of the three or more second inwardly extending roller support structures.

12. The wheel dolly of claim 11, wherein the first plurality of idle roller members are coupled proximate a midpoint of the three or more first roller support members proximate the angled surface thereof and wherein the second plurality of idle roller members are coupled proximate a midpoint of the three or more second roller support members proximate the angled surface thereof, the first and second plurality of idle roller members extending above the respective angled surfaces so that when the tire to be lifted will engage the first plurality of rollers members, glide over the angled surfaces and then engage the second plurality of roller members.

13. The wheel dolly of claim 1, wherein each of the first and second plurality of inwardly extending roller support structures is generally in the form of a right triangle with a hypotenuse side of each forming the angled surface.

14. A wheel dolly for lifting and transporting a flat tire attached to an aircraft, comprising:

a frame assembly comprising first and second laterally spaced frame members and a telescopic frame structure interposed between the first and second laterally spaced frame members;

a first actuator positioned within the telescopic frame structure and capable of selectively increasing or decreasing a distance between the first and second laterally spaced frame members;

a second actuator coupled to respective distal ends of the first and second laterally spaced frame members, the second actuator configured to selectively increasing or decreasing a distance between the first and second laterally spaced frame members at a same rate as the telescopic frame structure;

a pair of tire lifting assemblies, each fixedly coupled to a respective one of the first and second laterally spaced frame members, the pair of tire lifting assemblies comprising:

a first tire support structure comprising three or more first inwardly extending roller support structures, each of the inwardly extending roller support structures forming an inwardly extending cantilevered fin which forms a downwardly angled surface extending from the first frame member and lowers as it extends toward the second frame member, each first inwardly extending roller support structure fixedly coupled to the first side frame member in a cantilevered manner and defining a first leading edge that is positioned proximate a ground level; and a second tire support structure comprising three or more second inwardly extending roller support structures, each of the second plurality of inwardly extending roller support structures forming an inwardly extending cantilevered fin which forms a downwardly angled surface extending from the second frame member and lowers as it extends toward the first frame member, each second inwardly extending roller support structure fixedly coupled to the second side frame member in a cantilevered manner and defining a second leading edge that is positioned proximate a ground level;

a plurality of castors coupled to the frame assembly, the plurality of castors being freely rotatable relative to the frame assembly to allow the frame assembly to roll in any direction; and a self-contained hydraulic system coupled to the first and second actuators to selectively extend or retract the first and second actuators to cause the first and second laterally spaced frame members to move toward or away from one another.

15. The wheel dolly of claim 14, wherein the second actuator is releasable from and reconnectable to the frame assembly at at least one end thereof to allow the second actuator to be pivoted away from one of the first or second laterally spaced frame member.

16. The wheel dolly of claim 15, wherein the wheel dolly is positionable around the flat tire of the aircraft when the second actuator is released from the frame assembly and the second actuator is reconnectable to the frame assembly after the wheel dolly is positioned around the flat tire of the aircraft.

17. The wheel dolly of claim 14, wherein the telescopic frame structure comprises a first telescopic frame member and a second telescopic frame member at least partially inserted within the first telescopic frame member, the second telescopic frame member being longitudinally movable relative to the first telescopic frame member in order to increase or decrease a distance between the pair of tire lifting assemblies.

18. The wheel dolly of claim 14, wherein the self-contained hydraulic system is coupled to the telescopic frame structure, the self-contained hydraulic system configured to control simultaneous lengthening or shortening of the first and second actuators.

19. The wheel dolly of claim 14, wherein the pair of tire lifting assemblies each comprise a first plurality of idle rollers extending substantially an entire length of a respective leading edge of a respective one of the pair of tire lifting assembly.

20. The wheel dolly of claim 14, wherein the pair of tire lifting assemblies when brought together effectively form a V-shaped support surface for cradling and supporting above ground one or more tires of the aircraft positioned thereon.

\* \* \* \* \*